(12) United States Patent
Chae

(10) Patent No.: US 7,254,661 B2
(45) Date of Patent: Aug. 7, 2007

(54) METHODS, CIRCUITS, AND COMPUTER PROGRAM PRODUCTS FOR VARIABLE BUS ARBITRATION

(75) Inventor: Kwan-yeob Chae, Seoul (KR)

(73) Assignee: Samsung Electronics Co., Ltd. (KR)

( * ) Notice: Subject to any disclaimer, the term of this patent is extended or adjusted under 35 U.S.C. 154(b) by 146 days.

(21) Appl. No.: 10/921,607

(22) Filed: Aug. 19, 2004

(65) Prior Publication Data

US 2005/0060459 A1    Mar. 17, 2005

(30) Foreign Application Priority Data

Aug. 21, 2003  (KR) .................. 10-2003-0058000

(51) Int. Cl.
*G06F 13/36*       (2006.01)
(52) U.S. Cl. ..................................... 710/116
(58) Field of Classification Search ........ 710/107–125, 710/240–244
See application file for complete search history.

(56) References Cited

U.S. PATENT DOCUMENTS

| 4,009,470 | A | * | 2/1977  | Danilenko et al. | 711/151 |
|-----------|---|---|---------|------------------|---------|
| 4,449,183 | A | * | 5/1984  | Flahive et al.   | 711/151 |
| 5,068,782 | A | * | 11/1991 | Scheuneman et al.| 711/151 |
| 5,193,197 | A | * | 3/1993  | Thacker          | 710/123 |
| 5,241,632 | A |   | 8/1993  | O'Connell et al. | 710/117 |
| 5,357,512 | A | * | 10/1994 | Khaira et al.    | 370/439 |
| 5,367,678 | A | * | 11/1994 | Lee et al.       | 718/104 |
| 5,481,680 | A | * | 1/1996  | Larson et al.    | 710/112 |
| 5,487,170 | A | * | 1/1996  | Bass et al.      | 710/244 |
| 5,822,758 | A |   | 10/1998 | Loper et al.     | 711/130 |
| 5,862,355 | A | * | 1/1999  | Logsdon          | 710/116 |
| 6,006,303 | A | * | 12/1999 | Barnaby et al.   | 710/244 |
| 6,078,338 | A |   | 6/2000  | Horan et al.     | 345/521 |
| 6,092,137 | A | * | 7/2000  | Huang et al.     | 710/111 |
| 6,098,109 | A |   | 8/2000  | Kotzur et al.    | 709/249 |
| 6,185,221 | B1| * | 2/2001  | Aybay            | 370/412 |
| 6,389,480 | B1|   | 5/2002  | Kotzur et al.    | 709/249 |
| 6,629,176 | B1| * | 9/2003  | Rhee             | 710/240 |
| 6,647,449 | B1| * | 11/2003 | Watts            | 710/111 |
| 6,907,491 | B2| * | 6/2005  | Moss             | 710/309 |
| 6,978,329 | B1| * | 12/2005 | Harral           | 710/116 |

OTHER PUBLICATIONS

Andrew S. Tanenbaum, Structured Computer Organization, 1990, Prentice Hall, Third edition, pp. 11-13.*

* cited by examiner

*Primary Examiner*—Paul R. Myers
(74) *Attorney, Agent, or Firm*—Myers Bigel Sibley & Sajovec

(57) ABSTRACT

Arbitration for a communications channel can be provided by scheduling a grant for future access to one of a plurality of requestors to a communications channel shared by the plurality of requestors based on an indication of which of the plurality of requestors is granted access to the communications channel during a current access.

20 Claims, 6 Drawing Sheets

FIG. 1
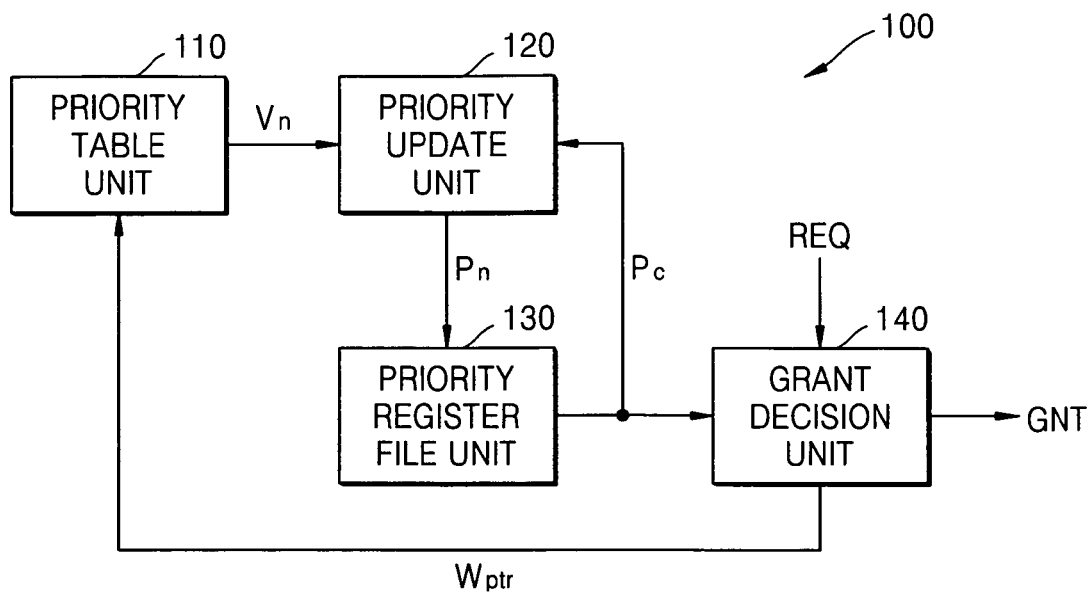
FIG. 2
| $W_{ptr}$ | $V0_n$ | $V1_n$ | $V2_n$ | $V3_n$ |
|---|---|---|---|---|
| 0 | V00 | V01 | V02 | V03 |
| 1 | V10 | V11 | V12 | V13 |
| 2 | V20 | V21 | V22 | V23 |
| 3 | V30 | V31 | V32 | V33 |
FIG. 3
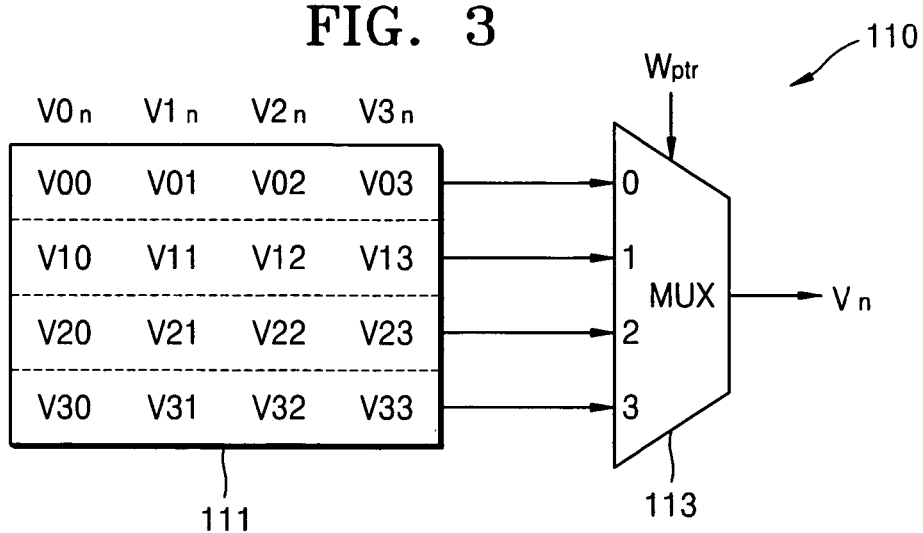

FIG. 5
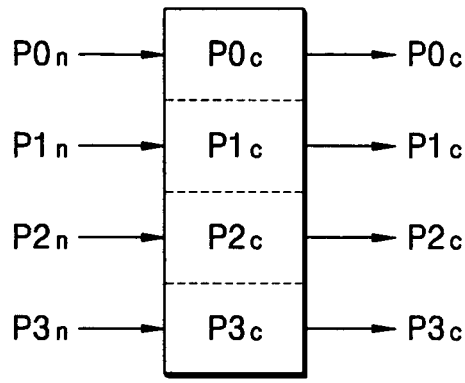
FIG. 6A
| $W_{ptr}$ | $V0_n$ | $V1_n$ | $V2_n$ | $V3_n$ |
|---|---|---|---|---|
| 0 | 1 | 2 | 3 | 0 |
| 1 | 2 | 3 | 0 | 1 |
| 2 | 3 | 0 | 1 | 2 |
| 3 | 0 | 1 | 2 | 3 |
FIG. 6B
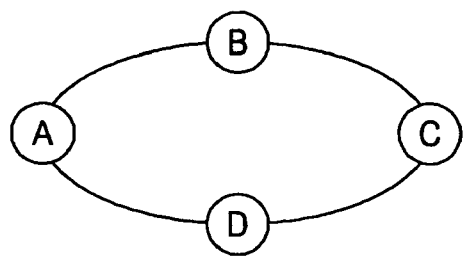

FIG. 11A
| W_ptr | V0 n | V1 n | V2 n | V3 n |
|---|---|---|---|---|
| 0 | 0 | 1 | 2 | 3 |
| 1 | 0 | 1 | 2 | 3 |
| 2 | 0 | 1 | 2 | 3 |
| 3 | 0 | 1 | 2 | 3 |
FIG. 11B
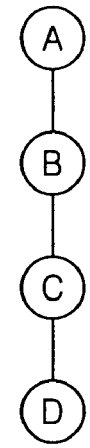
FIG. 12A
| W_ptr | V0 n | V1 n | V2 n | V3 n |
|---|---|---|---|---|
| 0 | 1 | 0 | 2 | 3 |
| 1 | 1 | 0 | 2 | 3 |
| 2 | 0 | 1 | 3 | 2 |
| 3 | 0 | 1 | 3 | 2 |
FIG. 12B
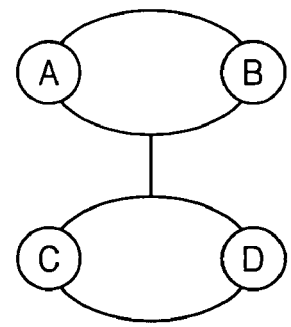
FIG. 13A
| W_ptr | V0 n | V1 n | V2 n | V3 n |
|---|---|---|---|---|
| 0 | 0 | 1 | 2 | 3 |
| 1 | 0 | 1 | 2 | 3 |
| 2 | 0 | 1 | 3 | 2 |
| 3 | 0 | 1 | 3 | 2 |
FIG. 13B
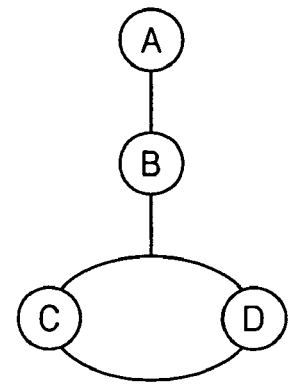

METHODS, CIRCUITS, AND COMPUTER PROGRAM PRODUCTS FOR VARIABLE BUS ARBITRATION

CROSS-REFERENCE TO RELATED APPLICATION

This application claims priority from Korean Patent Application No. 2003-58000, filed on Aug. 21, 2003, in the Korean Intellectual Property Office, the disclosure of which is incorporated herein by reference in its entirety.

FIELD OF THE INVENTION

The invention relates to the field of data processing in general, and more particularly, to bus arbitration in computer systems.

BACKGROUND

Arbitration circuits are used to perform bus arbitration among a plurality of requestors (or potential bus masters) connected to the bus. In particular, the requestors transmit signals requesting access to the bus, determines which of the requestors is to be granted access to the bus, and outputs a grant to the highest priority requestor (the potential bus master which the arbitration circuit has determined will be given access to the bus). Alternatively, the arbitration circuit can transmit grant information to each of the requestors indicating, for example, the order in which the requestors will gain access to the bus. Accordingly, each of the requestors may occupy the bus and transmit data.

Known bus arbitration methods include a fixed priority method where the bus requestor having the highest priority is granted the bus, a round-robin method where the each of the requestors is given access to the bus in-turn, and a multi-level method where a group of the requestors can be given priority over other groups of requestors. In other words, in some multi-level arbitration methods, a first group can have higher priority than a second group of requestors such that if any of the requestors in the first group requests access to the bus at the same time as one of the requestors in the second group, the requestor in the first group will be given access to the bus over the requestor in the second group. It is also known to combine some of the above conventional methods as discussed, for example, in U.S. Pat. No. 6,078,338 entitled Accelerated Graphics Port Programmable Memory Access Arbiter.

SUMMARY

Embodiments according to the invention can provide methods, circuits, and computer program products for variable bus arbitration. Pursuant to these embodiments, methods for providing arbitration for a communications channel can include scheduling a grant for future access to one of a plurality of requestors to a communications channel shared by the plurality of requestors based on an indication of which of the plurality of requestors is granted access to the communications channel during a current access.

In some embodiments according to the invention, scheduling can include providing the indication of which of the plurality of requestors is granted access to the communications channel during the present access to a programmable priority table configured to store priority vectors indicating respective priorities associated with plurality of requestors. In some embodiments according to the invention, the priority vectors include priorities for each of the plurality of requestors. In some embodiments according to the invention, methods can further include updating a current priority on which access to the communications channel during the current access is based using the indication to provide priority values for a next grant of access to the communications channel.

In some embodiments according to the invention, methods for providing arbitration for a communications channel can include granting access to one of a plurality of requestors to a communications channel shared by the plurality of requestors based on a current priority vector including current priority values for each of the plurality of requestors. An indication of which of the plurality of requestors is granted access to the communications channel during a current time can be provided to a programmable table of priority vectors including the current priority vector. A next priority vector can be provided from the programmable table using the indication. The current priority vector can be updated using the next priority vector to provide an updated current priority vector. A grant for access to the communications channel can be provided to one of the plurality of requestors responsive to requests therefrom based on the updated current priority vector.

In some embodiments according to the invention, providing a grant for access can further include providing the grant according to a round-robin priority method. In some embodiments according to the invention, providing a grant for access can further include providing the grant according to a group priority method.

In some embodiments according to the invention, providing a grant for access can further can include providing the grant according to a group priority and round-robin method. In some embodiments according to the invention, providing a grant for access can further include providing the grant according to a fixed priority method. In some embodiments according to the invention, the communications channel can be a bus configured for use in a computer system.

In some embodiments according to the invention, a circuit for providing arbitration for a communications channel can include a grant decision unit configured to grant access to one of a plurality of requestors to a communications channel shared by the plurality of requestors based on a current priority vector including current priority values for each of the plurality of requestors and configured to provide an indication of which of the plurality of requestors is granted access to the communications channel during a current time. A programmable table of priority vectors, including the current priority vector, can be configured to provide a next priority vector from the programmable table using the indication. A priority update unit can be configured to update the current priority vector using the next priority vector to provide an updated current priority vector. A priority register file unit can be configured to provide the current priority vector for the current time and configured to store the updated current priority vector for use in granting access to the communications channel to one of the plurality of requestors responsive to requests therefrom during a future time.

In some embodiments according to the invention, a computer program product for providing arbitration for a communications channel can include a computer readable medium having computer readable program code embodied therein, the computer readable program product. Computer readable program code can be configured to grant access to one of a plurality of requestors to a communications channel shared by the plurality of requestors based on a current priority vector including current priority values for each of the plurality of requestors. Computer readable program code can configured to provide an indication of which of the plurality of requestors is granted access to the communications channel during a current time to a programmable table of priority vectors including the current priority vector. Computer readable program code can be configured to provide a next priority vector from the programmable table using the indication. Computer readable program code can be configured to update the current priority vector using the next priority vector to provide an updated current priority vector. Computer readable program code can be configured to provide a grant for access to the communications channel to one of the plurality of requestors responsive to requests therefrom based on the updated current priority vector.

BRIEF DESCRIPTION OF THE DRAWINGS

FIG. 1 is a block diagram of an arbiter according to some embodiments of the invention FIG. 2 illustrates a bus arbitration algorithm table according to some embodiments of the invention.

FIG. 3 illustrates a priority table unit of FIG. 1 according to some embodiments of the invention.

FIG. 5 illustrates a priority register file unit of FIG. 1 according to some embodiments of the invention.

FIG. 6A illustrates a bus arbitration table using a round-robin bus arbitration method according to some embodiments of the invention.

FIG. 6B is a diagram that illustrates a bus arbitration table using a round-robin bus arbitration method according to some embodiments of the invention.

FIG. 11A illustrates a bus arbitration table using a fixed priority bus arbitration method according to some embodiments of the invention.

FIG. 11B is a diagram that illustrates a bus arbitration table using a fixed priority bus arbitration method according to some embodiments of the invention.

FIG. 12A illustrates a bus arbitration table using a group priority bus arbitration method where requestors A and B are in a group having higher priority than another group including requestors C and D according to some embodiments of the invention.

FIG. 12B is a diagram that illustrates a bus arbitration table using a group priority bus arbitration method according to some embodiments of the invention.

FIG. 13A illustrates a bus arbitration table using a bus arbitration method where the requestors C and D have a same priority level next to the requestor B according to some embodiments of the invention.

FIG. 13B is a diagram that illustrates a bus arbitration table using a group priority bus arbitration method according to some embodiments of the invention.

DETAILED DESCRIPTION OF EMBODIMENTS ACCORDING TO THE INVENTION

Figure 4:
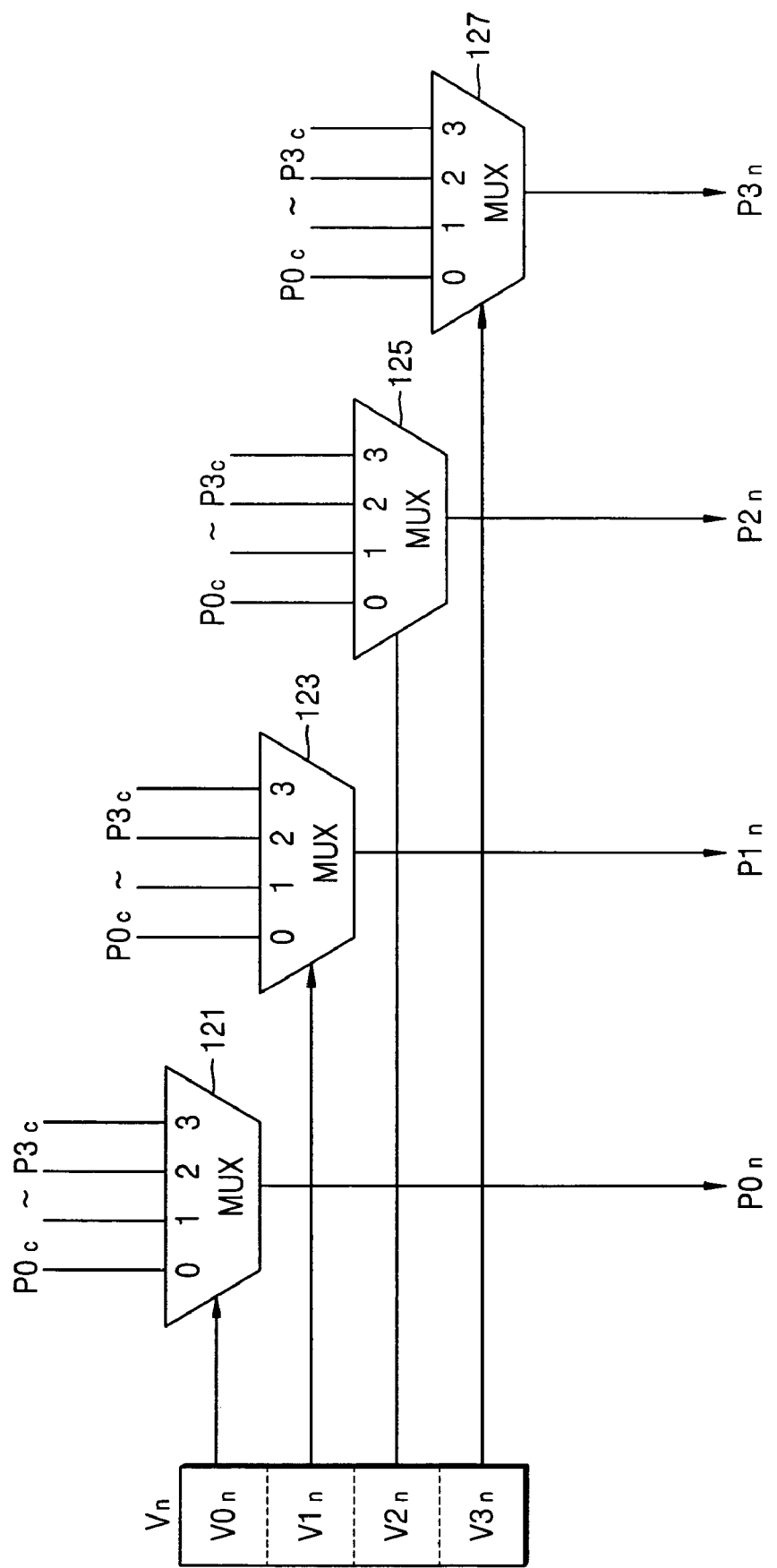
FIG. 4 illustrates a priority update unit of FIG. 1 according to some embodiments of the invention.
Figure 7:
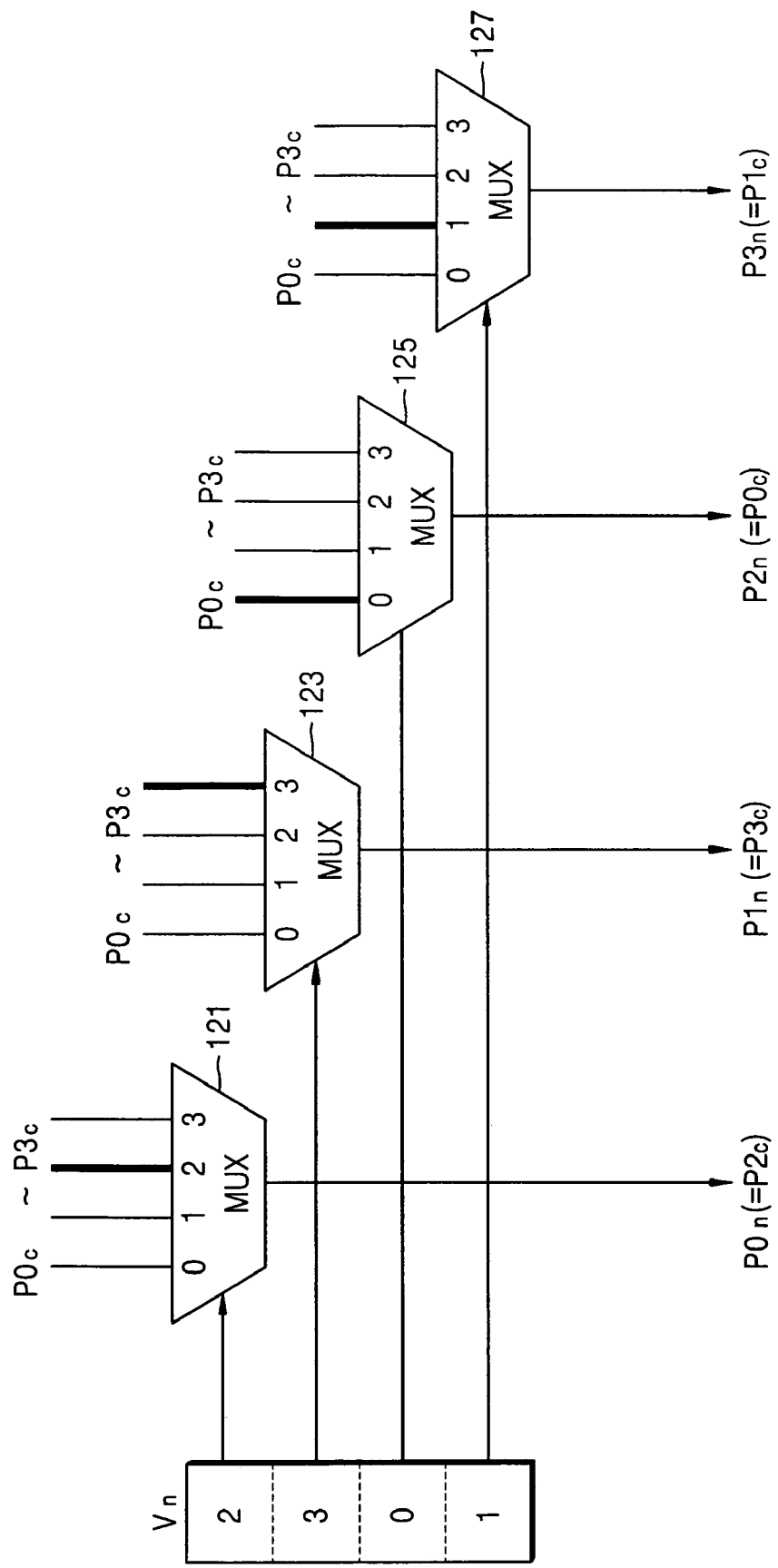
FIG. 7 is a block diagram of the priority update unit for illustrating a priority vector update operation when pointer information of "1" is output according to a previous bus arbitration operation in FIG. 6 according to some embodiments of the invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

It will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an arbiter 100 according to some embodiments of the invention for arbitration for a shared communications channel, such as a computer system bus. The arbiter 100 includes a priority table unit 110, a priority update unit 120, a priority register file unit 130, and a grant decision unit 140. The priority table unit 110 stores a bus arbitration method table and outputs a select vector Vn corresponding to pointer information Wptr from the bus arbitration method table in response to the pointer information Wptr. The pointer information Wptr is output from the grant decision unit 140 as described below.

FIG. 2 illustrates a bus arbitration table in a case where the number of requestors is 4 according to some embodiments of the invention. Hereinafter, the number of requestors (or master blocks) is assumed to be 4 unless otherwise specified. The requestors transmit request signals REQ to gain access to the bus, which is provided as a bus occupancy grant signal GNT from the arbiter 100.

The bus arbitration table includes digital data V00 through V33 determined by programming select vectors V0 through V3 (not shown) predetermined by a user to apply bus arbitration for the 4 requestors. The programming can be achieved by, for example, by algorithmic generation, storing the digital data in a register, and/or storing the digital data in a non-volatile memory (such as a flash memory). The pointer information Wptr can have a value of 0-3 to select the corresponding select vector Vn from the bus arbitration table. That is, the select vector V0 can be selected by applying the information pointer Wptr of 0 to provide the 4 elements V00, V01, V02, and V03 from the table. Likewise, the select vector V1 corresponding to the information pointer Wptr of 1 includes 4 elements V10, V11, V12, and V13, the select vector V2 corresponding to the information pointer Wptr of 2 includes 4 elements V20, V21, V22, and V23, and the select vector V3 corresponding to the information pointer Wptr of 3 includes 4 elements V30, V31, V32, and V33. Accordingly, in some embodiments according to the invention including 4 requestors, 4 digital data values are associated with each select vector. Moreover, 4 separate select vectors are used so that a total of 16 digital data values are stored in the bus arbitration table. However, in general cases where N requestors are supported, $N^2$ digital data values are stored in the table. The number of elements V0$n$ through V3$n$ of each of the select vectors V0 through V3 is the same as the number of requestors (4 in FIG. 2).

Bus arbitration according to some embodiments of the invention is described with reference to FIGS. 6 through 13. Referring to FIG. 3, the priority table unit 110 includes a storage unit 111 and a multiplexer (MUX) 113. The storage unit 111 stores the bus arbitration methods. The MUX 113 outputs the select vector Vn selected by the pointer information Wptr from the bus arbitration table. For example, in a case where the pointer information Wptr is 1, the MUX 113 outputs 4 vector elements V10, V11, V12, and V13 as the select vector Vn. The priority update unit 120 updates a current priority vector Pc so as to correspond to the select vector Vn and outputs a next priority vector Pn.

FIG. 4 illustrates the priority update unit 120 of FIG. 1 according to some embodiments of the invention. The priority update unit 120 includes a plurality of MUXs 121, 123, 125, and 127, that can each select corresponding inputs P0c through P3c of the current priority vector Pc to be output as the elements V0$n$ through V3$n$ of the select vector Vn, updating elements P0$n$ through P3$n$ of the next priority vector Pn with the selected elements P0c through P3c. For example, in a case where one of the elements V0$n$ through V3$n$ of the select vector Vn is the digital data "00", the corresponding MUX of the MUXs 121, 123, 125, and 127, selects the element P0c of the current priority vector Pc to be output therefrom and update the corresponding element of the next priority vector Pn with the selected element P0c.

Likewise, in a case where one of the elements V0$n$ through V3$n$ of the select vector Vn is the digital data "01", the corresponding MUX of the MUXs 121, 123, 125, and 127, selects the element P1$c$ of the current priority vector Pc to be output to update the corresponding element of the next priority vector Pn with the selected elements P1$c$. In a case where one of the elements V0$n$ through V3$n$ of the select vector Vn is the digital data "10", the corresponding MUX of the MUXs 121, 123, 125, and 127, selects the element P2$c$ of the current priority vector Pc to be output to update the corresponding element of the next priority vector Pn with the selected element P2$c$. In a case where one of the elements V0$n$ through V3$n$ of the select vector Vn is the digital data "11", the corresponding MUX of the MUXs 121, 123, 125, and 127, selects the element P3$c$ of the current priority vector Pc to be output to update the corresponding element of the next priority vector Pn with the selected element P3$c$.

The priority register file unit 130 receives the next priority vector Vn (selected by the MUXs 121, 123, 125, and 127), and outputs an updated current priority vector Pc. FIG. 5 illustrates the priority register file unit 130 of FIG. 1 according to some embodiments of the invention. The priority register file unit 130 in configured to store elements P0$n$ through P3$n$ of the next priority vector Pn during an active state of a current system clock period. During a subsequent system clock period, the priority register file unit 130 in configured to output the elements P0$n$ through P3$n$ of the next priority vector Pn (stored in the register during the earlier clock period) as the elements P0$c$ through P3$c$ of the current priority vector Pc. Accordingly, in some embodiments according to the invention, the priority register file unit 130 outputs the current priority vector Pc and receives and stores the next priority vector Pn.

In response to bus occupancy request signals REQs received from a plurality of requestors, the grant decision unit 140 outputs a bus occupancy grant signal GNT to one of the plurality of requestors according to the priority indicated by the current priority vector Pc and outputs the pointer information Wptr corresponding to a priority number of the requestor receiving the bus occupancy grant signal GNT. In FIG. 5, the elements P0$c$, P1$c$, P2$c$, and P3$c$ of the current priority vector Pc are matched with "0", "1", "2", and "3" of the priority number representing the priority of the 4 requestors, respectively. That is, the priority number of the requestor assigned by the element P0$c$ is "0", and this means the requestor assigned by the element P0$c$ has the highest priority among the 4 requestors. Likewise, the priority numbers of the requestors assigned by the elements P1$c$, P2$c$, and P3$c$ are "1", "2", and "3", respectively, and this means the priorities of the remaining requestors are sequentially assigned. The priority numbers representing the priorities of the requestors are matched with order numbers of the elements V0$n$, V1$n$, V2$n$, and V3$n$ composing each of the select vectors V0 through V3 of FIG. 2. The number of requestors is not limited. If the number of requestors is 4, the number of digital data V00 through V33, which are the elements composing the select vectors V0 through V3 in the bus arbitration algorithm table, is 16. If the number of requestors is N, the number of digital data V00 through V33, which are the elements composing the select vectors V0 through V3 in the bus arbitration algorithm table, is $N^2$.

Hereinafter, an operation of the arbiter according to an embodiment of the invention will be described in more detail with a case where the number of requestors is 4. FIG. 6A illustrates use of a bus arbitration table using a round-robin bus arbitration method according to some embodiments of the invention. Referring to FIG. 6A, a bus arbitration table includes entries for Wptr equal to 0, 1, 2, and 3 corresponding to 2-bit digital data "00", "01", "10", and "11", which are elements of the select vector Vn and the elements 0 through 3 of the pointer information Wptr correspond to respective select vectors V0 through V3. If the bus arbitration table is stored in the priority table unit 110, the arbiter according to some embodiments of the invention operates with the round-robin bus arbitration granting the highest priority to the 4 requestors A through D on a round-robin basis as shown in FIG. 6B so that each requestor receives equal access to the bus.

Figure 8:
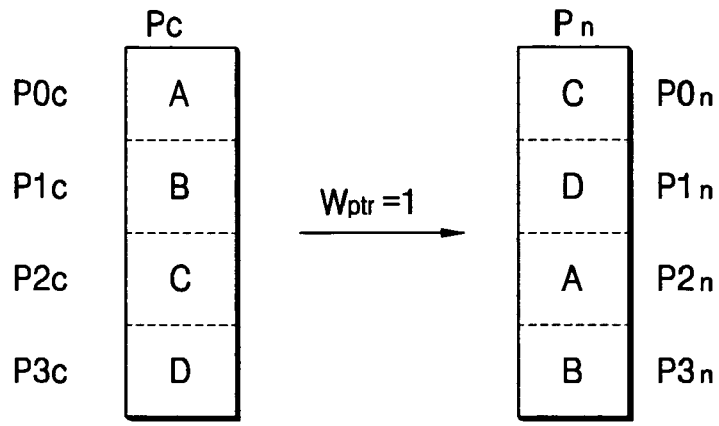
FIG. 8 illustrates the priority register file unit in which a new priority vector is rearranged for master IDs according to the result of FIG. 7 according to some embodiments of the invention.

That is, it is assumed that the grant decision unit 140 outputs the bus occupancy grant signal GNT to the requestor B of the requestors A through D according to the priorities corresponding to the current priority vector Pc, in which the priority numbers of the requestors A, B, C, and D are designated "0", "1", "2", and "3", respectively, in response to the bus occupancy request signals REQs received from the 4 requestors A through D. At this time, since the priority number of the requestor B receiving the bus occupancy grant signal GNT is "1", the grant decision unit 140 outputs the pointer information Wptr of "1" equal to the priority number. If "1" is output as the pointer information Wptr, the priority update unit 120 updates the current priority vector Pc so as to correspond to the select vector ("2", "3", "0", and "1") and outputs the elements (P2$c$, P3$c$, P0$c$, and P1$c$ in a sequence of the priority numbers) of the next priority vector Pn. At this time, the priority register file unit 130 outputting the current priority vector Pc receives and stores the next priority vector Pn and outputs the next priority vector Pn as the current priority vector Pc. Accordingly, in response to the bus occupancy request signal REQ received from each of a plurality of requestors, the grant decision unit 140 outputs the bus occupancy grant signal GNT to any one of the plurality of requestors according to the priority corresponding to the elements (P2$c$, P3$c$, P0$c$, and P1$c$ in a sequence of the priority numbers) of the current priority vector Pc and also outputs the pointer information Wptr corresponding to the priority number of the requestor receiving the bus occupancy grant signal GNT. Here, a sequence of the priority corresponding to the elements (P2$c$, P3$c$, P0$c$, and P1$c$ in a sequence of the priority numbers) of the current priority vector Pc, that is, the priorities of the requestors whose priority numbers are designated in a sequence of "0", "1", "2", and "3" are C, D, A, and B as shown in FIG. 8.

Figure 9:
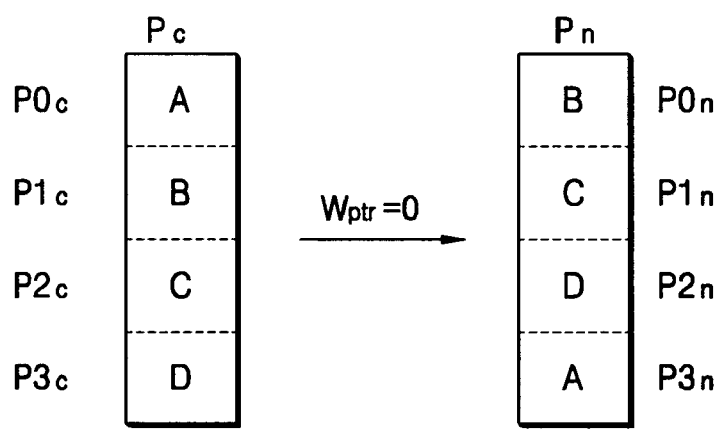
FIG. 9 illustrates the priority register file unit in which the new priority vector is rearranged for the master IDs when the pointer information of "0" is output according to the previous bus arbitration operation in FIG. 6 according to some embodiments of the invention.

Next, as shown in FIG. 9, the grant decision unit 140 outputs the bus occupancy grant signal GNT to the requestor A of the requestors A through D according to the priorities of the current priority vector Pc, in which the priority numbers of the requestors A, B, C, and D are designated as "0", "1", "2", and "3", respectively. At this time, since the priority number of the requestor receiving the bus occupancy grant signal GNT is "0", the grant decision unit 140 outputs the pointer information Wptr of "0" equal to the priority number. Here, according to the elements (P1$c$, P2$c$, P3$c$, and P0$c$ in a sequence of the priority numbers) of the next priority vector Pn corresponding to a new select vector ("1", "2", "3", and "0"), the priorities of the requestors whose priority numbers are designated in a sequence of "0", "1", "2", and "3" are B, C, D, and A as shown in FIG. 9.

Figure 10:
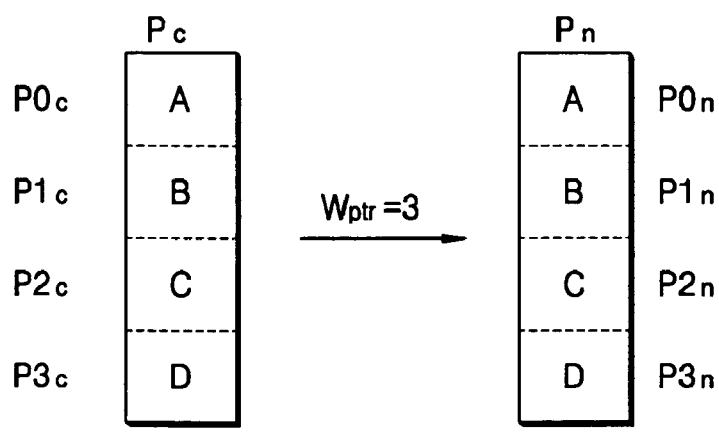
FIG. 10 illustrates the priority register file unit in which the new priority vector is rearranged for the master IDs when the pointer information of "3" is output according to the previous bus arbitration operation in FIG. 6 according to some embodiments of the invention.

Likewise, it is assumed that the grant decision unit 140 outputs the bus occupancy grant signal GNT to the requestor D of the requestors A through D according to the priorities of the current priority vector Pc, in which the priority numbers of the requestors A, B, C, and D are designated as "0", "1", "2", and "3", respectively. At this time, since the priority number of the requestor receiving the bus occupancy grant signal GNT is "3", the grant decision unit 140 outputs the pointer information Wptr of "3" equal to the priority number. Here, according to the elements (P0c, P1c, P2c, and P3c in a sequence of the priority numbers) of the next priority vector Pn corresponding to a new select vector ("1", "2", "3", and "0"), the priorities of the requestors whose priority numbers are designated in a sequence of "0", "1", "2", and "3" are A, B, C, and D as shown in FIG. 10.

That is, by the bus arbitration table as shown in FIG. 6, the arbiter according to some embodiments of the invention operates according to a round-robin bus arbitration method. For the 4 requestors A, B, C, and D, if the requestor B receives the bus occupancy grant signal GNT, the requestor C has the highest priority in the next time, and if the requestor A receives the bus occupancy grant signal GNT, the requestor B has the highest priority in the next time. Likewise, if the requestor C receives the bus occupancy grant signal GNT, the requestor D has the highest priority in the next time, and if the requestor D receives the bus occupancy grant signal GNT, the requestor A has the highest priority in the next time.

FIG. 11A illustrates a bus arbitration table using a fixed priority bus arbitration method according to some embodiments of the invention. Referring to FIG. 11, according to the elements (P0c, P1c, P2c, and P3c in a sequence of the priority numbers) of the next priority vector Pn corresponding to a select vector ("0", "1", "2", and "3") updated with the same value without regards to the pointer information Wptr, the priorities of the requestors whose priority numbers are designated in a sequence of "0", "1", "2", and "3" are always A, B, C, and D. That is, by the bus arbitration table as shown in FIG. 11, the arbiter according to some embodiments of the invention operates according to the fixed priority bus arbitration method. For the 4 requestors A, B, C, and D, even though any one of the requestors A, B, C, and D receives the bus occupancy grant signal GNT, a highest priority is always granted to a bus master that the highest priority is granted at first and priorities of the remaining requestors are maintained as they are.

FIG. 12A illustrates a bus arbitration table using a group priority bus arbitration method where the requestors A and B are in a higher priority group than the group including requestors C and D. Referring to FIG. 12A, in a case where the pointer information Wptr is "0" or "1", according to the elements (P1c, P0c, P2c, and P3c in a sequence of the priority numbers) of the next priority vector Pn corresponding to an updated select vector ("1", "0", "2", and "3"), the priorities of the requestors whose priority numbers are designated in a sequence of "0", "1", "2", and "3" is B, A, C, and D. Also, in a case where the pointer information Wptr is "2" or "3", the priorities of the requestors are A, B, D, and C. That is, by the bus arbitration table as shown in FIG. 12A, the arbiter according to some embodiments of the invention operates according to a fixed priority and the round-robin method between groups of requestors. For the 4 requestors A, B, C, and D, a first group including the requestors A and B has a higher priority than a second group including the requestors C and D. Also, in a case where the bus occupancy grant signal GNT is received in the second group, the requestor D has a higher priority than the requestor C. However, if the group receiving the bus occupancy grant signal GNT shifts from the second group to the first group (for example, in a case where the pointer information Wptr is changed from "2" to "1"), the priorities of C and D are exchanged. Likewise, in a case where the bus occupancy grant signal GNT is received in the first group, the requestor B has a higher priority than the requestor A. However, if the group receiving the bus occupancy grant signal GNT shifts from the first group to the second group (for example, in a case where the pointer information Wptr is changed from "1" to "2"), the priorities of A and B are exchanged. That is, in a case where the number of requestors is more than 4, when the requestors are divided into a plurality of groups, for all cases divided into the plurality of groups, the fixed priority algorithm and the round-robin method can be used among the groups, and for the requestors included in any one of the groups, the fixed priority algorithm and the round-robin algorithm can also be used, as shown in FIG. 12B.

FIG. 13A illustrates a bus arbitration table using a bus arbitration method where the requestors C and D have the same priority next to the requestor B. Referring to FIG. 13A, in a case where the pointer information Wptr is "0" or "1", according to the elements (P0c, P1c, P2c, and P3c in a sequence of the priority numbers) of the next priority vector Pn corresponding to an updated select vector ("0", "1", "2", and "3"), the priorities of the requestors whose priority numbers are designated in a sequence of "0", "1", "2", and "3" are A, B, C, and D. Also, in a case where the pointer information Wptr is "2" or "3", the priorities of the requestors are A, B, D, and C.

That is, by the bus arbitration table as shown in FIG. 13A, the arbiter according to some embodiments of the invention operates with the fixed priority method and the round-robin method for the requestors divided into three groups. This case is used for performing an efficient arbiter operation by providing an opportunity to receive the bus occupancy grant signal GNT even to the requestor D when the requestor D having the lowest priority in the fixed priority algorithm cannot receive the bus occupancy grant signal GNT. For the 4 requestors A, B, C, and D, a group including the requestors C and D has lower priority than the requestors A and B. Also, in a case where the bus occupancy grant signal GNT is received in the group including the requestors C and D, the requestor C has higher priority than the requestor D. However, if the requestor receiving the bus occupancy grant signal GNT shifts to the group including requestors A and B (for example, in a case where the pointer information Wptr is changed from "2" to "1"), the priorities of C and D are exchanged. Likewise, if the requestor receiving the bus occupancy grant signal GNT shifts from the requestor A or B to the group including C and D (for example, in a case where the pointer information Wptr is changed from "1" to "2"), the priorities of C and D are exchanged again and the requestor C has a higher priority than the requestor D. As described above, in a case where the number of requestors is more than 4, when the requestors are divided into a plurality of groups, for all cases divided into the plurality of groups, the fixed priority algorithm and the round-robin algorithm can be used for the groups, and for the requestors included in any one of the groups, the fixed priority algorithm and the round-robin algorithm can also be used.

As described above, since an arbiter according to an embodiment of the invention includes a priority table unit 110 storing a bus arbitration algorithm table, when a user programs the bus arbitration algorithm table suitable for a system, the arbiter is effectively adapted to various type buses which can occur in various applications and an efficient bus arbitration algorithm is realized.

As appreciated by the present inventors, conventional arbitration circuits may implement arbitration methods (programmable or otherwise) without regard for the type of bus for which the requestors arbitrate. That is, an efficient method for one type of bus may not be efficient for a different type of bus. In some embodiments according to the invention, arbitration methods can be programmed to efficiently perform the bus arbitration by adapting to different type bus operation situations occurring in a plurality of applications.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed:

1. A method for providing arbitration for a communications channel comprising:
    scheduling a grant for future access to one of a plurality of requestors to a communications channel shared by the plurality of requestors based on an indication of which of the plurality of requestors is granted access to the communications channel during a current access and further based on a plurality of priority values corresponding to the plurality of requestors; and
    providing the indication of which of the plurality of requestors is granted access to the communications channel during the present access to a programmable priority table configured to store priority vectors indicating respective priorities associated with the plurality of requestors.

2. A method according to claim 1 wherein the priority vectors include priorities for each of the plurality of requestors.

3. A method according to claim 1 further comprising:
    updating a current priority on which access to the communications channel during the current access is based using the indication to provide priority values for a next grant of access to the communications channel.

4. A method for providing arbitration for a communications channel comprising:
    granting access to one of a plurality of requestors to a communications channel shared by the plurality of requestors based on a current priority vector including current priority values for each of the plurality of requestors;
    providing an indication of which of the plurality of requestors is granted access to the communications channel during a current time to a programmable table of priority vectors including the current priority vector;
    providing a next priority vector from the programmable table using the indication;
    updating the current priority vector using the next priority vector to provide an updated current priority vector; and
    providing a grant for access to the communications channel to one of the plurality of requestors responsive to requests therefrom based on the updated current priority vector.

5. A method according to claim 4 wherein providing a grant for access further comprises:
    providing the grant according to a round-robin priority method.

6. A method according to claim 4 wherein providing a grant for access further comprises:
    providing the grant according to a group priority method.

7. A method according to claim 4 wherein providing a grant for access further comprises:
    providing the grant according to a group priority and round-robin method.

8. A method according to claim 4 wherein providing a grant for access further comprises:
    providing the grant according to a fixed priority method.

9. A method according to claim 1 wherein the communications channel comprises a bus configured for use in a computer system.

10. A circuit for providing arbitration for a communications channel comprising:
    a grant decision unit configured to grant access to one of a plurality of requestors to a communications channel shared by the plurality of requestors based on a current priority vector including current priority values for each of the plurality of requestors and configured to provide an indication of which of the plurality of requestors is granted access to the communications channel during a current time;
    programmable table of priority vectors, including the current priority vector, configured to provide a next priority vector from the programmable table using the indication;
    a priority update unit configured to update the current priority vector using the next priority vector to provide an updated current priority vector; and
    a priority register file unit configured to provide the current priority vector for the current time and configured to store the updated current priority vector for use in granting access to the communications channel to one of the plurality of requestors responsive to requests therefrom during a future time.

11. A circuit according to claim 10 wherein the priority vectors comprise a round-robin priority method.

12. A circuit according to claim 10 wherein the priority vectors comprise a group priority method.

13. A circuit according to claim 10 wherein the priority vectors comprise a group priority and round-robin method.

14. A computer program product for providing arbitration for a communications channel comprising:
    a computer readable medium having computer readable program code embodied therein, the computer readable program product comprising:
        computer readable program code configured to grant access to one of a plurality of requestors to a communications channel shared by the plurality of requestors based on a current priority vector including current priority values for each of the plurality of requestors;
        computer readable program code configured to provide an indication of which of the plurality of requestors is granted access to the communications channel during a current time to a programmable table of priority vectors including the current priority vector;
        computer readable program code configured to provide a next priority vector from the programmable table using the indication;
        computer readable program code configured to update the current priority vector using the next priority vector to provide an updated current priority vector; and
        computer readable program code configured to provide a grant for access to the communications channel to one of the plurality of requestors responsive to requests therefrom based on the updated current priority vector.

15. A computer program product according to claim 14 wherein the computer readable program code configured to provide a grant comprises computer readable program code configured to provide the grant according to a round-robin priority method.

16. A computer program product according to claim 14 wherein the computer readable program code configured to provide a grant comprises computer readable program code configured to provide the grant according to a group priority method.

17. A computer program product according to claim 14 wherein the computer readable program code configured to provide a grant comprises computer readable program code configured to provide the grant according to a group priority and round-robin method.

18. A computer program product according to claim 14 wherein the computer readable program code configured to provide a grant comprises computer readable program code configured to provide the grant according to a fixed priority method.

19. A computer program product according to claim 14 wherein the communications channel comprises a bus configured for use in a computer system.

20. A method according to claim 1, wherein the plurality of requestors comprise N requestors, wherein the programmable table is configured to store N priority vectors, wherein each of the priority vectors comprises N values, and wherein the programmable table is further configured to store $N^2$ values.

* * * * *